(12) United States Patent
Clack

(10) Patent No.: US 7,704,461 B2
(45) Date of Patent: *Apr. 27, 2010

(54) VIRTUAL SORBENT BED SYSTEMS AND METHODS OF USING SAME

(75) Inventor: Herek L. Clack, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 1237 days.

This patent is subject to a terminal disclaimer.

(21) Appl. No.: 11/140,832

(22) Filed: May 31, 2005

(65) Prior Publication Data

US 2006/0011464 A1 Jan. 19, 2006

Related U.S. Application Data

(60) Provisional application No. 60/576,334, filed on Jun. 1, 2004.

(51) Int. Cl.
*B01J 19/12* (2006.01)
(52) U.S. Cl. .................. 422/186.01; 96/71; 96/78; 96/51; 96/54
(58) Field of Classification Search ......... 422/186–189; 96/71–78, 52–54
See application file for complete search history.

(56) References Cited

U.S. PATENT DOCUMENTS

| 5,439,513 A | * | 8/1995 | Periasamy et al. | ............. 96/25 |
| 5,648,049 A | * | 7/1997 | Jones et al. | ................. 422/170 |
| 6,699,440 B1 | | 3/2004 | Vermeulen | |

OTHER PUBLICATIONS

Lackowski et al., "Aerosol Charging in Alternating Electric Field," Abstracts of the European Aerosol Conference 2001, pp. S951-S952.
Zhu et al., "Mass Transfer From an Oscillating Microsphere," Journal of Colloid and Interface Science 249, 351-358 (2002) doi: 10.1006/jcis.2002.8284, available online at http://www.idealibrary.com; pp. 351-358.
Laitinen et al., "Bipolar Charged Aerosol Agglomeration With Alternating Electric Field in Laminar Gas Flow," Journal of Electrostatics 38 (1996) pp. 303-315.
Guan et al., "Simulation of Mass Transfer From an Oscillating Microdroplet," International Journal of Heat and Mass Transfer 48 (2005), pp. 1705-1715.

* cited by examiner

*Primary Examiner*—Jennifer K Michener
*Assistant Examiner*—Xiuyu Tai
(74) *Attorney, Agent, or Firm*—K&L Gates LLP

(57) ABSTRACT

Virtual sorbent bed systems and methods for receiving contaminants from a waste stream are presented. In an embodiment, the virtual sorbent bed system comprises an outlet for introducing into the gas stream a material capable of receiving contaminants, a first charged DC electrode oriented substantially peripheral to the gas stream and normal to the flow of the gas stream; a second charged DC electrode oriented substantially peripheral to the gas stream and normal to the flow of the gas stream, wherein the first DC charged electrode and the second charged DC electrode cooperatively generate a first electric field that imparts a drift velocity to the material; and a plurality of charged AC electrodes oriented substantially peripheral to the gas stream and normal to the flow of the gas stream, wherein the charged AC electrodes generates a second electric field that imparts additional three-dimensional motion to the material.

18 Claims, 13 Drawing Sheets

VIRTUAL SORBENT BED SYSTEMS AND METHODS OF USING SAME

CROSS REFERENCE TO RELATED APPLICATIONS

Figure 1A:
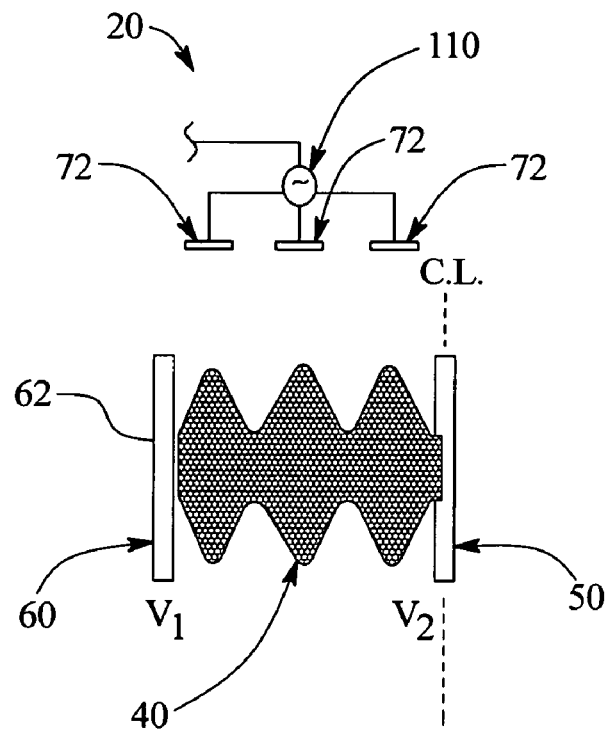

This patent application claims the benefit of U.S. Provisional Patent Application No. 60/576,334, filed on Jun. 1, 2004, the disclosure of which is herein incorporated by reference.

BACKGROUND OF THE INVENTION

The present invention relates generally to chemical technologies. More specifically, the present invention relates to virtual sorbent bed systems and methods of using same.

Mercury has been recognized as a serious pollutant of concern due to its toxic and bioaccumulative properties. Trace amounts of mercury can be magnified up the aquatic food chain hundreds of thousands of times, posing a potential risk to humans and wildlife that consume contaminated fish. In human beings, mercury adversely affects the central nervous system—the brain and spinal cord—posing a significant risk to developing children.

The U.S. EPA has created new regulations for the emission of mercury. The impending mercury emissions regulations will most directly affect municipal incinerators, medical-waste incinerators, and coal-burning boilers of electric utilities. These are the largest sources of mercury emissions in the U.S., each accounting for roughly one-third of the total amount of mercury released in the U.S.

Municipal and medical-waste incinerators have specific characteristics that are conducive to controlling mercury emissions. Generally, the exhaust streams of both municipal and medical-waste incinerators are small and contain relatively high concentrations of mercury. These characteristics allow conventional exhaust cleaning methods to effectively remove mercury. In particular, 70% of the mercury in the exhaust of municipal and medical-waste incinerators is in the form of mercuric chloride ($HgCl_2$), which is easily removed by wet scrubbing and dry absorption processes. The characteristics of municipal and medical-waste incinerators allow mercuric chloride ($HgCl_2$) to form. Because plastic comprises a large percentage of the wastes destroyed in incinerators, an ample source of chlorine is available for the high temperature oxidation of elemental mercury ($Hg^0$) to mercuric chloride ($HgCl_2$).

Compared to municipal and medical-waste incinerators, the removal of mercury from the exhaust of coal-burning boilers of electrical utilities is more complex. Coal contains only trace amounts of mercury, 1-15 parts per billion, by weight. However, although coal contains only trace amounts of mercury, in 1997 combustion of over 900 million tons of coal released 50 tons of mercury into the environment. Compared to municipal and medical-waste incinerators, the typical exhaust gas stream from a coal-fired boiler is very large. The mercury in the exhaust of coal-burning boilers can exist in both physical forms (vapor and condensed) and in both oxidation sates (elemental ($Hg^0$) and oxidized ($HgCl_2$)). The total concentration of mercury and its distribution among the various forms and oxidation states initially depends on the details of the combustion process and the rank of the origin of the coal. However, these distributions are dynamic, shifting with changing gas temperature and gas composition throughout the exhaust train. As no two coal-fired boilers have identical configurations, the evolution of mercury in the post-combustion environment is virtually unique to each facility. Consequently, controlling mercury emissions from coal combustion is extremely difficult due to the large degree of variability and uncertainty in the phase, state, and concentration of mercury emitted from different facilities.

The electric utility industry is largely unprepared to reduce mercury emissions. There is no feasible commercial technology available for controlling mercury emissions from coal-fired boilers. Prior art attempts at mercury emission control technologies, such as U.S. Pat. No. 6,699,440 to Vermeulen, focus on fixed bed adsorption, requiring that the mercury-laden flue gas pass through a layer of powdered sorbent deposited on a fabric filter. As 90% of coal-fired boilers do not have such fabric filers installed, such an approach constitutes a prohibitively expensive retrofit for many operators. Installing fabric filters would also create increased pressure drop in the waste gas stream, entailing additional costs to install downstream induced draft fans, as well as reinforcement of upstream ductwork to support the greater pressure differential. These issues create a high projected cost for reducing mercury emissions. Under contemporary pollution control technology, a 90% reduction in mercury emissions is projected to cost the electric utility industry from $6 billion to $15 billion annually.

It is therefore desirable to provide an efficient and cost-effective technology for removing heavy metals and other chemicals from waste gas streams.

SUMMARY OF THE INVENTION

The present invention generally relates to virtual sorbent bed systems that provide for an efficient and economical way for receiving (e.g. adsorbing, absorbing, contacting, mass transferring) various compounds from waste gas streams.

In an embodiment, the present invention provides a system that comprises: at least one outlet for introducing a material into the gas stream, wherein the material is capable of receiving the contaminant from the gas stream; at least a first charged DC electrode; at least a second charged DC electrode, wherein the first DC charged electrode and the second charged DC electrode cooperatively generate a first electric field that imparts a drift velocity to the material; and at least one charged AC electrode, wherein the one charged AC electrode generates a second electric field that imparts additional motion (e.g. two or three dimensional motion) to the material.

In an embodiment, the material is electrically charged prior to entering the gas stream.

In an embodiment, the first charged DC electrode and the second charged DC electrode have a different voltage.

In an embodiment, the outlet comprises the first charged DC electrode.

In an embodiment, the second charged electrode comprises a plate capable of receiving and collecting the material.

In an embodiment, the at least first charged AC electrode comprises a plurality of charged AC electrodes, each charged AC electrode oriented substantially peripheral to the gas stream and normal to the flow of the gas stream, wherein each charged AC electrode generates a secondary electric field that imparts additional motion to the material.

In an embodiment, the at least one outlet comprises a plurality of outlets that are stacked.

In an embodiment, the at least one outlet comprises a plurality of outlets that are in series along the gas stream.

In an embodiment, the motion is periodic.

In an embodiment, the material is a solid material selected from the group consisting of a sorbent, a catalyst and combinations thereof.

In an embodiment, the material is capable of receiving a plurality of contaminants from the gas stream.

In an embodiment, the outlet is capable of injecting a liquid into the gas stream.

In an embodiment, the outlet is located upstream of the first charged DC electrode.

In an embodiment, the injected liquid is selected from the group consisting of an ammonia solution, a urea solution, an aerosol and combinations thereof.

In another embodiment, the present invention provides a virtual sorbent bed system comprising: a plurality of positively charged DC outlets for introducing a material into the gas stream, wherein the material is capable of receiving the contaminant from the gas stream and wherein the positively charged DC outlets are oriented substantially peripheral to the gas stream and normal to the flow of the gas stream; at least a second negatively charged DC electrode located downstream of the positively charged DC outlets and oriented substantially peripheral to the gas stream and normal to the flow of the gas stream, wherein the plurality of positively charged DC outlets and the second negatively charged DC electrode cooperatively generate a first electric field that imparts a drift velocity to the material; and a plurality of charged AC electrodes oriented substantially peripheral to the gas stream and normal to the flow of the gas stream, wherein the plurality of charged AC electrodes generate a second electric field that imparts additional motion to the material.

In an embodiment, the material is selected from the group consisting of a solid material, a liquid material, a powdered material, an aerosol, a sorbent, a catalyst and combinations thereof.

In another embodiment, the present invention provides a method for receiving contaminants from a gas stream, the method comprising: introducing a material into the gas stream through at least one outlet, wherein the material is capable of receiving the contaminant from the gas stream; generating a first electric field from at least a first DC charged electrode and at least a second charged DC electrode, wherein the first electric field imparts a drift velocity to the material and wherein the first and second DC charged electrodes are oriented substantially peripheral to the gas stream and normal to the flow of the gas stream; and generating a second electric field from at least one charged AC electrode oriented substantially peripheral to the gas stream and normal to the flow of the gas stream, wherein the second electric field imparts additional motion to the material.

In an embodiment, the method comprises capturing or collecting the material after the material has removed the contaminant from the gas stream.

An advantage of the present invention is to provide a more cost effective and efficient system for receiving or removing contaminants from a waste gas stream.

Another advantage of the present invention is to provide an efficient system for detecting biological contaminants in the air.

Still another advantage of the present invention is to provide a system for reusing sorbent thereby obtaining a cost-savings.

Additional features and advantages of the present invention are described in, and will be apparent from, the following Detailed Description of the Invention and the figures.

BRIEF DESCRIPTION OF THE FIGURES

FIG. 1A is a schematic illustrating an end view of the virtual sorbent bed system in one embodiment of the present invention.

FIG. 1B is a schematic illustrating an top or plan view of the virtual sorbent bed system in one embodiment of the present invention.

FIG. 2 is a graph illustrating the comparison of the particle trajectories and normalized swept volume for particles subjected to hydrodynamic drag, electrostatic drift and electrodynamic oscillation.

FIG. 3 is a schematic illustrating constructions of injected sorbent residence time.

FIG. 4 is a graph illustrating the radial distributions of property or concentration differentials for an axisymmetric jet.

FIG. 5 is a graph illustrating normalized radial concentration gradients for four initial jet velocity ratios.

FIG. 6 is a chart illustrating the in-flight adsorption efficiency versus the number of Teflon spheres.

FIG. 7 is a graph illustrating the comparison of in-flight and fixed bed adsorption.

FIG. 8 is a schematic illustrating an experimental model of the virtual sorbent bed apparatus in one embodiment of the present invention.

FIG. 9 is a schematic view of the virtual sorbent bed system in one embodiment of the present invention.

FIG. 10 is a perspective view of an embodiment of the virtual sorbent bed system in one embodiment of the present invention.

FIG. 11 is a front view of the virtual sorbent bed system of FIG. 10 in one embodiment of the present invention.

FIG. 12 is a side or elevation view of the virtual sorbent bed system showing the outlets stacked in one embodiment of the present invention.

FIG. 13 is a top or plan view of the virtual sorbent bed system showing the outlets in series in one embodiment of the present invention.

DETAILED DESCRIPTION OF THE INVENTION

The present invention relates to chemical remediation technologies for receiving (e.g. adsorbing, absorbing, contacting, mass transferring) various pollutants from emitted industrial gas streams. More specifically, the present invention relates to virtual sorbent bed ("VSB") systems and methods of using same. In an embodiment, the VSB system generally comprises electrodes or any suitable electric field generators that produce electric fields (e.g. AC and DC) which manipulate the movement of a charged suspension of a sorbent powder to separate contaminants such as heavy metals and other chemicals from waste gas streams.

Sorbent beds may be, for example, dense, charged suspensions of a sorbent. The sorbent can be any suitable material, such as powdered activated carbon, that is capable of being suspended or movable in gas streams and capable of receiving heavy metals and chemicals from gas streams. The dense, charged suspension can be bounded by mutually orthogonal AC and DC electric fields. It has been found that the application of electrostatic (DC) and electrodynamic (AC) forces on the particles in the suspension causes them to trace sinusoidal paths through the flowing gas. The continuous, sinusoidal relative motion between the suspended particles and flowing gas greatly enhances gas-particle mass transfer as compared to the diffusive mass transfer that would occur within a suspension having no net charge. Yet, because the particles are suspended within the flowing gas, they induce effectively no fluid pressure drop.

FIGS. 1A and 1B show a schematic of an end view and a top or plan view, respectively, of one general embodiment of the VSB system 20 adapted specifically for removing trace concentrations of mercury from coal combustion exhaust. Suspended and charged sorbent or material 40 issues into the mercury-laden exhaust stream from at least one injector or outlet 50 comprising at least one first charged DC electrode 52. The charged material 40 may comprise, for example, a solid powdered sorbent or a liquid material. The material 40 may be positively or negatively charged or not charged at all. The arrow represents the direction of the airflow in FIG. 1B. The induced DC electric field between the first charged outlet 50 and a plate 60 comprising at least one second DC electrode 62 exerts a constant coulombic force on the charged material 40. In another embodiment, the plate 60 could be distinct from the second DC electrode(s).

The first charged DC electrode 52 and the second charged DC electrode 62 have a different voltage thereby forming a direct current field between the two charged sources. This field induces a constant electrostatic drift velocity, normal to the gas velocity, drawing the charged material 40 through and across the mercury-laden gas stream. In another embodiment, the first charged DC electrode could have a positive or negative voltage and the second charged DC electrode could be the ground (i.e. 0 voltage). It should be appreciated that any suitable combination of voltages/ground can be used for the first and second DC electrodes to generate a potential difference and a direct current field between the electrodes.

Similarly, charged AC electrodes 72 generate complementary AC electric fields that superimpose a sinusoidally varying electrodynamic drift velocity that is orthogonal to both the gas velocity and the electrostatic drift velocity. The cumulative effect of both electric fields is to impart a high degree of relative motion (e.g. two and three dimensional motion) between the gas and the particulate phases. It should be appreciated that the shape of the suspended material 40 in the Figures are for illustrative purposes only and are not intended to represent the actual motion of the suspended material 40.

Figure 1B:
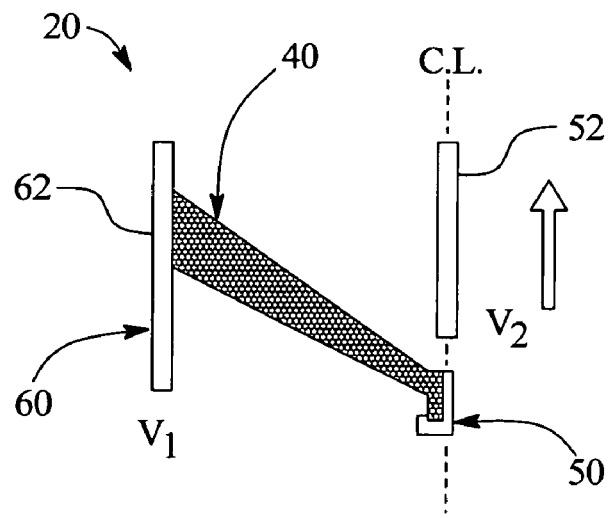

Alternatively, the embodiments shown in FIGS. 1A-1B may represent half of the embodiments as depicted by the center line C.L. For example, the outlets 50 and first DC electrode 52 may have on both sides the plate 60, second DC electrodes 62 and AC electrodes 72 to double the flow-through gas volume.

In an embodiment, the VSB system 20 utilizes, for example, a gas solid mass transfer process that exploits the beneficial mass transfer characteristics of suspensions. The relatively small temporal and spatial scales of dense and/or turbulent suspensions complicate characterization of their behavior. The VSB system 20, by virtue of its exceptional control over the dispersed phase exerted by the dual electric fields, allows existing mass transfer coefficients and correlations to be extended to dense and/or turbulent suspensions.

Figure 2:
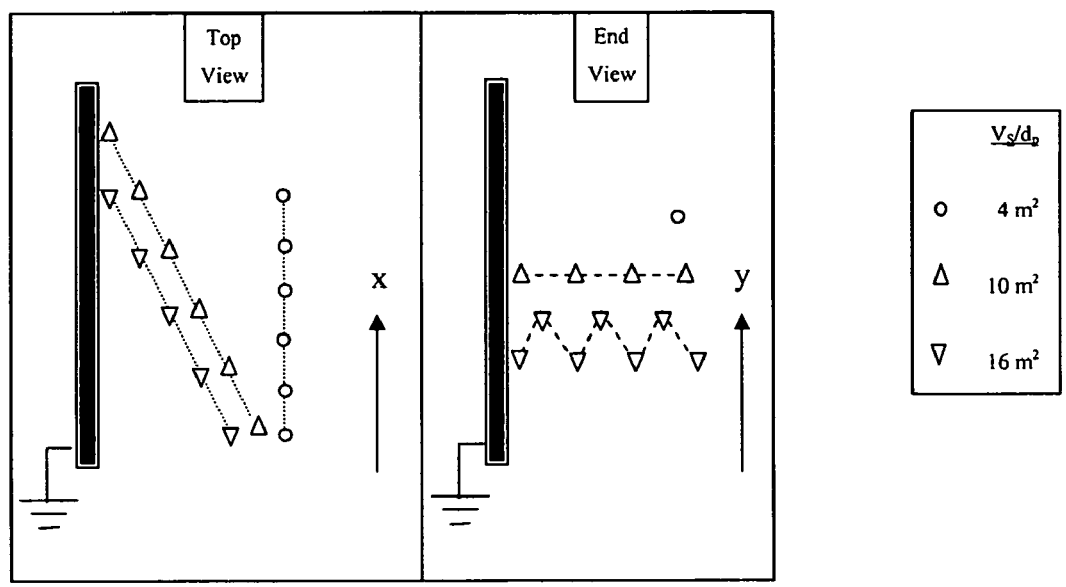

FIG. 2 illustrates the effect of gas-particle relative motion on mass transfer to the particulate phase. FIG. 2 depicts trajectories of sorbent particles under three conditions: 1) subjected to hydrodynamic forces alone 12; 2) subjected to both hydrodynamic and electrostatic forces 14; and 3) subjected to hydrodynamic, electrostatic, and electrodynamic forces combined 16. The superposition of hydrodynamic, electrostatic, and electrodynamic forces causes the particles to trace the longest paths through the gas. Defining swept volume $V_S$ as the product of particle path length and particle cross-sectional area, for a specified particle diameter, the value of $V_S$ will increase as the particle path length increases. Defining a normalized swept volume $V_S/d_p$ (where $d_p$ is the particle diameter) provides a means for comparing the mass transfer enhancement exhibited by particles of different sizes as they are subjected to hydrodynamic, electrostatic, and electrodynamic forces.

In FIG. 2, for a representative particle size, charge, and gas velocity, the normalized swept volume $V_S/d_p$ increases from 4 m$^2$ for hydrodynamic forces alone to 16 m$^2$ when hydrodynamic, electrostatic, and electrodynamic forces are superposed, a four-fold increase. Assuming that gas-particle mass transfer scales with $V_S/d_p$, these results suggest that virtual sorbent beds should achieve four times greater mass transfer than uncharged suspensions. The differences in mass transfer are even more striking if they are considered relative to a coordinate system moving with the gas. Such a coordinate system is more appropriate than an inertial coordinate system for considering gas-particle mass transfer. If in this coordinate system, a modified swept volume ($V^*_S$) and modified normalized swept volume ($V^*_S/d_p$) are defined, then the values of $V^*_S/d_p$ are 0 m$^2$ for hydrodynamic forces alone, 6 m$^2$ for both hydrodynamic and electrostatic forces, and 12 m$^2$ for combined hydrodynamic/electrostatic/electrodynamic forces. In summary, imposing electrostatic/electrodynamic forces produces a substantial performance enhancement for mass transfer over uncharged suspensions.

In an embodiment, the method of receiving contaminants from a gas stream comprises introducing charged powdered sorbent into the gas stream. For example, the outlet 50 can introduce the charged powdered sorbent as a dense suspension initially contained within a low-velocity planar jet. This approach concentrates the suspension to enhance mass transfer and inhibits turbulent mixing of the sorbent-laden jet with its surroundings, thereby minimizing jet mixing and its associated negative impacts on mass transfer within the sorbent suspensions.

In another embodiment, the VSB system 20 utilizes entrained or in-flight adsorption. In-flight adsorption occurs within flowing gas-sorbent suspensions. In-flight adsorption offers larger gas-sorbent interfacial areas and longer periods of gas-sorbent contact. Sorbent particles in suspension more easily dissipate the heat of adsorption, eliminating the risk of carbon bed fires. Applied to coal combustion, the VSB requires no expensive retrofits to install baghouse filters and induce minimal pressure drop in the gas stream. In an embodiment, the VSB system 20 can be paired in series with an electrostatic precipitator. This would allow the injected sorbent and fly ash to be collected separately so that the former can be recycled and regenerated while also preserving the market for fly ash. In an embodiment, the VSB system 20 is highly flexible, allowing it to respond in real time to operational transients, fuel blending, fuel switching, and part-load operation. Unlike fixed sorbent beds formed on fabric filters, the VSB system 20 can be completely idled, becoming a transparent exhaust train component when conditions warrant. Finally, in-flight and fixed bed adsorption for mercury control need not be mutually exclusive. Injecting a powdered sorbent to establish a downstream fixed sorbent bed necessarily involves the creation of a gas-sorbent suspension. Consequently, even where fixed bed adsorption is favored, in-flight adsorption can augment the performance of the fixed bed and reduce rates of sorbent usage.

Figure 3:
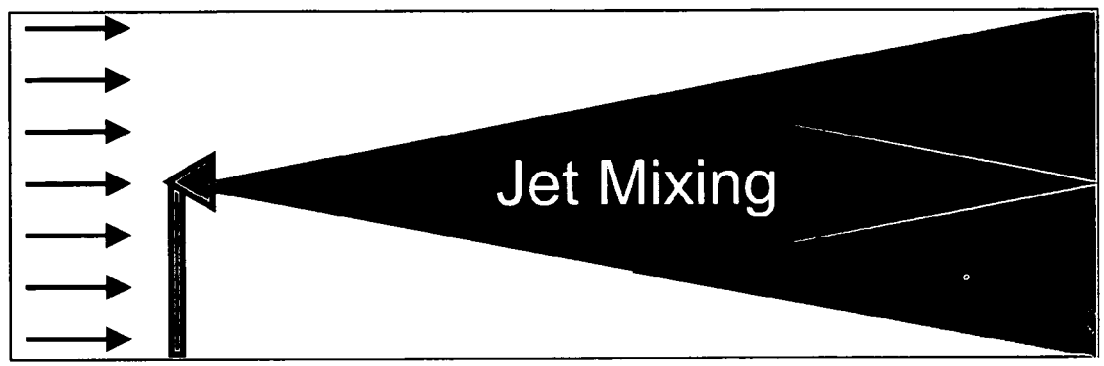

As shown in FIG. 3, dry sorbent injection for mercury capture typically takes the form of a powdered sorbent, suspended on high velocity axisymmetric gas jet, and injected in a downstream orientation. A single injector lance or an array of lances may cause an "in-flight" or "entrained flow" residence time. This figure is intended to reflect the elapsed time between sorbent injection and sorbent filtration on a downstream fabric filter, typically between 0.5 and 2 seconds. However, this time value may be determined by dividing the distance between injection and filtration by the mean velocity of the gas in the duct upstream of the injectors. Sorbent injection tends to concentrate the sorbent in the jet core where velocities remain substantially higher than the surrounding medium for many nozzle radii downstream. The net result is that sorbent in the jet core traverses short distances up to 25% faster than the medium outside the jet. Solid or liquid matter suspended within a gaseous jet tends to remain concentrated near the jet core as the jet itself expands.

Figure 4:
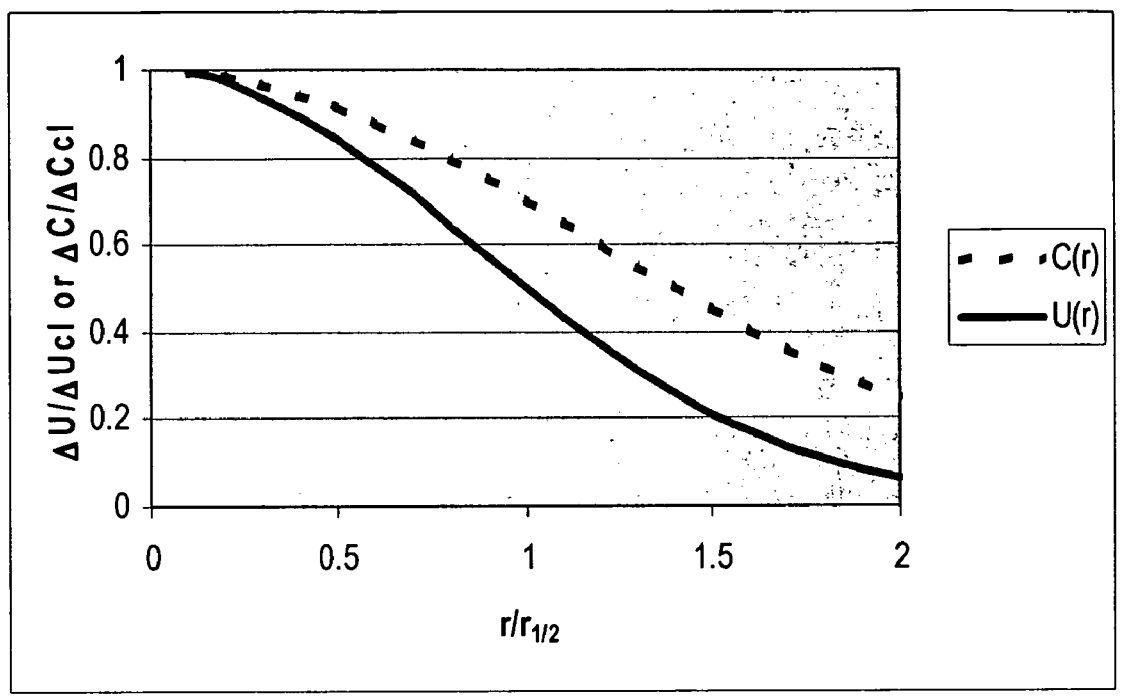
Figure 5:
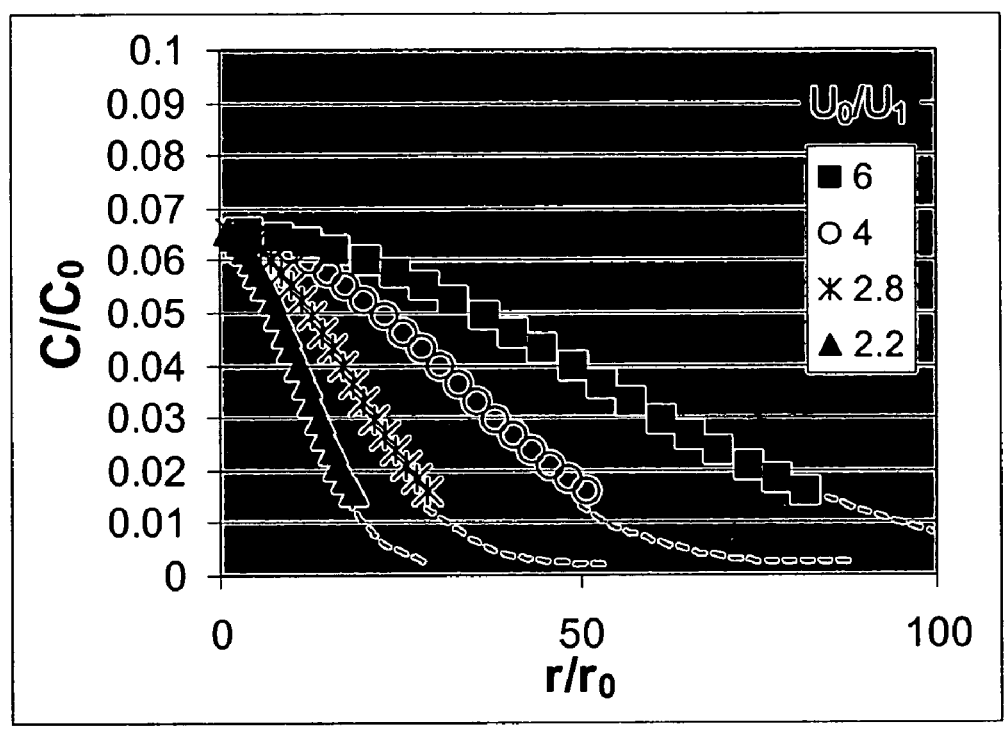
Figure 6:
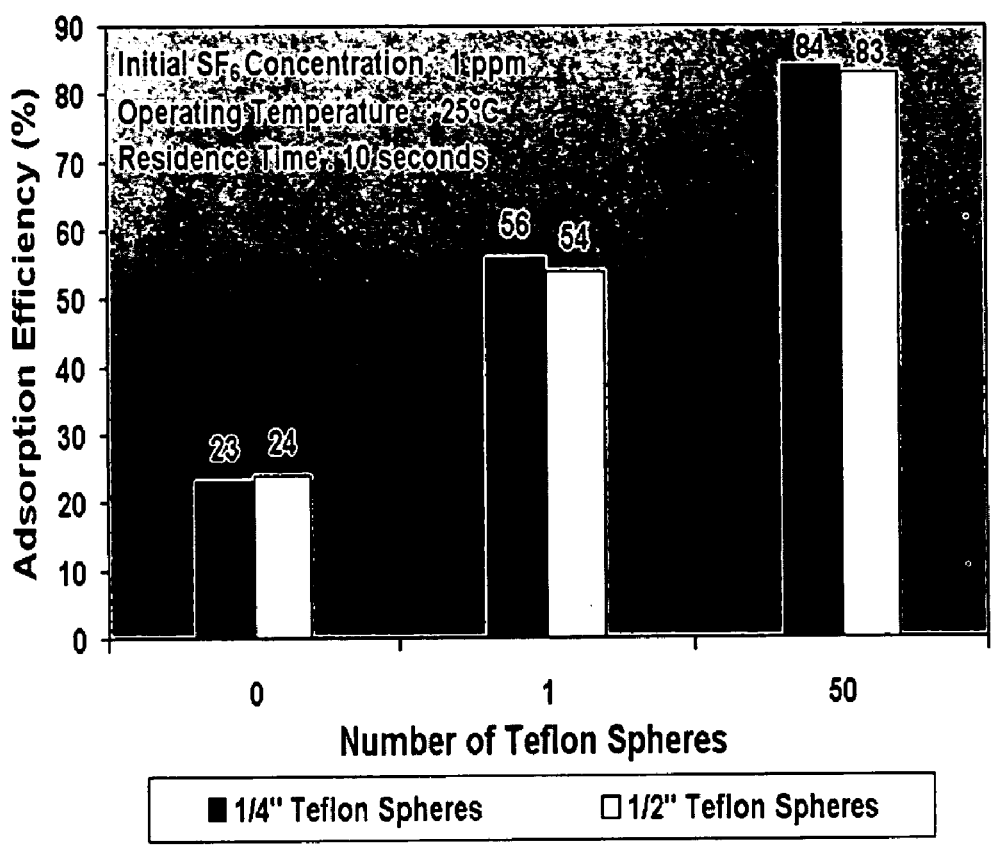
Figure 7:
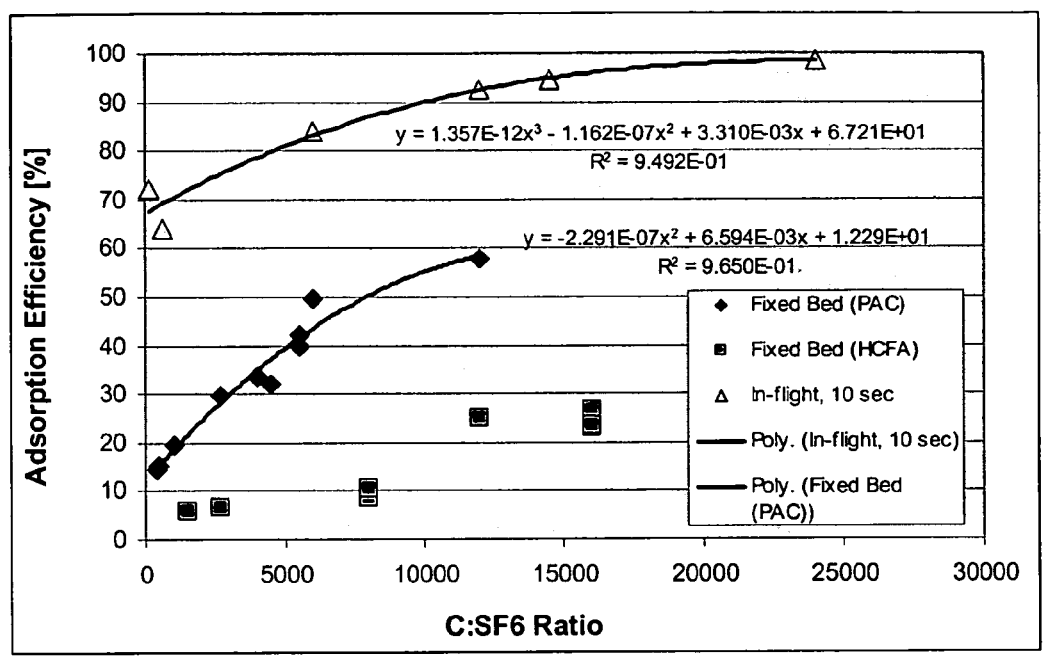
Figure 8:
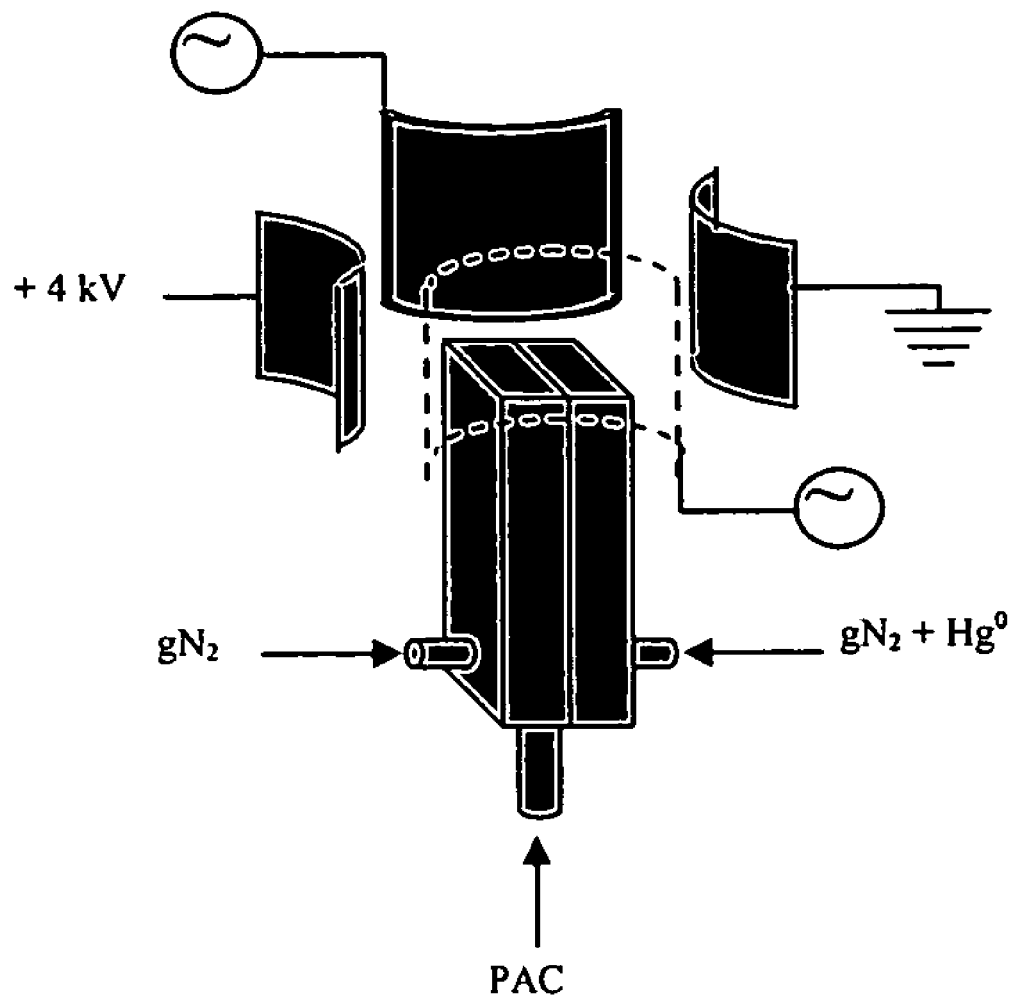

FIG. 4 illustrates the radial distribution of normalized property differentials in an axisymmetric jet. The velocity difference U(r) between the jet and the surrounding medium at any radial location decreases with increasing radial distance from the centerline. The species concentration C(r) within the jet decays less rapidly than velocity, indicating that material suspended within the jet undergoes a slower rate of radial spread and dispersion than the jet itself.

FIG. 5 presents four normalized radial concentration profiles at a distance of 18 m from a 1.25 cm injector orifice, representing four jet-to-freestream velocity ratios ($U_0/U_1$). The primary difference between the different profiles is the higher rate of jet spreading, and the attendant increase in jet cross-sectional area, with increasing velocity ratio. Higher jet velocities produce wider jets at a given downstream location. The radial growth of the jet leads to an inherent decrease in injected species concentration as the jet volume increases. Species concentration decreases with increasing downstream distance, decaying as the inverse of jet diameter squared. However, dispersion of mass transfer of the injected species does not keep pace with the jet spreading rate. The injected species remains concentrated about the jet centerline, irrespective of the initial velocity ratio of the jet.

Under the proper conditions, trace gas adsorption within turbulent gas-sorbent suspensions could far exceed the adsorption efficiencies of fixed sorbent beds on a per mass basis. These results (FIGS. 6 and 7) are based on the following experimental method. A cylindrical aluminum pressure vessel, mounted on a paint shaker, contains a set number of Teflon spheres. After evacuating the cylinder, a 10 ppm mixture of nitrogen gas and sulfur hexafluoride ($SF_6$) gas is added. A mass of powdered activated carbon is injected into the cylinder, forming a suspension. The paint shaker is then started, mechanically agitating the cylinder. The agitation of the cylinder by the paint shaker causes random motion of the Teflon spheres inside the cylinder, simulating isotropic turbulence. After a set period of time, the paint shaker is stopped, the contents of the cylinder extracted, and the residual concentration of $SF_6$ measured by Fourier transform infrared (FTIR) spectroscopy. The data showed that compared to the adsorption achieved with no Teflon spheres in the cylinder, the addition of a single sphere doubles the adsorption efficiency. Adsorption efficiency increases further as the number of Teflon spheres increases from 1 to 50.

Additional results provided a much more comprehensive evaluation of the influence of sphere diameter, agitation time, suspension temperature and moisture content, injected sorbent mass, and sorbate concentration on adsorption within these turbulent gas-sorbent suspensions. Comparable fixed bed adsorption results were obtained by drawing the same $SF_6/N_2$ gas mixtures through fixed sorbent beds containing the same amount of sorbent that was injected for the in-flight tests. For the carbon mass ratios examined (120:1 to 6000:1), the fixed bed adsorption efficiency was negligible. This demonstrates that, particularly at low carbon mass ratios, fixed bed adsorption is quite ineffective relative to turbulence-assisted in-flight adsorption. Given that powdered activated carbon costs on the order of $1 per pound, the opportunity to reduce carbon mass ratios translates directly into reduced operating costs.

FIG. 7 presents a more extensive comparison of in-flight vs. fixed bed adsorption (up to 25,000:1 carbon mass ratio) obtained using the same experimental method. The adsorption data associated with higher carbon mass ratios confirm the previous conclusion that in-flight adsorption is far more effective than fixed bed adsorption at low carbon mass ratios. As carbon mass ratio increases, fixed bed adsorption performance improves, but still falls well short of the in-flight adsorption performance. Fly ash has been proposed as a potential sorbent "generated in situ" because fly ash contains varying amounts of unburned carbon that has a finite sorption capacity.

Electrostatic drift of particles within a suspension enhances mass transfer. When powdered activated carbon is injected upstream of an electrostatic precipitator, up to 70% removal can be achieved within the electrostatic precipitator. This suggests that the electrostatic drift velocity imposed on the sorbent particles in the electrostatic precipitator is the result of adsorption by fly ash and sorbent dust cake covering the plate electrodes within the electrostatic precipitator. It was, however, shown that a representative Schmidt number (the ratio of dynamic viscosity, $\nu$, and binary diffusion coefficient, $D_{ad}$), Sc, for a mercury-laden flow through an electrostatic precipitator is 12. For Sc=12, the mercury concentration gradients are confined to a region very near the walls of the electrostatic precipitator, making it impossible to support Fickian diffusion of mercury from the bulk gas flow to the electrostatic precipitator surfaces.

The VSB may have a dense suspension. As an example, consider 1 $m^3$ of air (at standard temperature and pressure) containing 15 ppbw of elemental mercury. Treating this gas volume by uniformly dispersing powdered activated carbon at a carbon-to-mercury mass ratio of 30,000:1 would yield a suspension having a minimum interparticle spacing of 3.4 mm (85 particle diameters for 40 μm particles). By contrast, the VSB would concentrate the same mass of sorbent into a dense sorbent layer (1 m×1 m, H×W), the minimum interparticle spacing would decrease by 66% (1.1 m, 28 particle diameters) compared to the uniformly distributed case.

It should be appreciated that the beneficial characteristics of alternative embodiments of the VSB system can be extended to many other processes involving mass transfer between a flowing gas and a solid material. For example, catalytic gas treatment processes often employ large, unwieldy, solid catalyst monoliths. In order to maximize gas-solid mass transfer, these monoliths often take the form of high surface area honeycomb structures. Although such structures present a very large surface area for mass transfer, they also induce a large pressure drop within the gas flow. A VSB system would provide equal or greater surface area for mass transfer without any induced pressure drop in the gas stream.

FIG. 8 illustrates an experimental scheme of an embodiment of the VSB system. For example, the experimental VSB system comprises two conjoined rectangular plenums (e.g. Plexiglass) and fitted with gas connections at their bases. Both plenums dispense gas flows vertically upward. The left-hand plenum dispenses the charged sorbent powder suspended in a nitrogen gas stream that, under the influence of AC and DC electric fields, forms the VSB system. The right-hand plenum dispenses a nitrogen gas stream containing trace concentrations of the sorbate species (e.g. elemental mercury, $Hg^0$). The two gas streams are dispensed at a common elevation plane and with identical velocities. The resulting parallel, co-flowing gas streams form a planar geometry that is diagnostically and analytically convenient.

Nitrogen gas is mixed with charged powdered activated carbon (e.g. 30 μm mean particle diameter) that is fed into the left-hand plenum by a stainless steel auger. The auger feed rate varies with input voltage, permitting the mass ration of carbon to sorbate (e.g. carbon-to-mercury ratio) to be varied from $10^2$:1 to $10^5$:1. A high voltage source in contact with the metal auger provides a mechanism for simultaneous powder charging and feeding. A honeycomb flow straightener (not shown) at the exit plane of the right-hand plenum maintains a spatially uniform flow. Electronic flow controllers (not shown) meter the flow rates of nitrogen into both plenums and to assure that the exit velocities of both flows are equal and representative of flue gas velocities (2-5 m/s in a precipitator). Preferably, the two flows are equal and representative of exist velocity in order to prevent the development of a shear layer at the interface between the two streams. The development of a shear layer would produce turbulent eddies that would interfere with the electrostatic/electrodynamic particle drift from the suspended sorbent flow into the trace gas flow. The twin fluid flows are oriented upward to negate any effects of gravitation settling on the motion of particles.

Upstream electrical resistance heaters (not shown) provide optional heating of both gas flows prior to their entering the two plenums. Gas temperatures typically range form 110 to 150° C. inside an operating electrostatic precipitator. Because powdered activated carbon adsorption capacity decreases with increasing temperature, how VSB performance varies with gas temperature should be evaluated to optimize performance conditions. Behavior similar to the preliminary results is expected, which showed that in-flight adsorption surpasses fixed bed adsorption on a per mass of sorbent basis even at elevated temperatures.

For mercury adsorption data, a permeation oven infuses a metered nitrogen gas stream of 44 ppb of elemental mercury ($Hg^0$) in a process identical to previous in-flight mercury investigations. For other sorbate data such as toluene and benzene, passing a nitrogen gas stream over a constant temperature liquid sorbate bath infuses it with an equilibrium concentration of sorbate vapor.

The performance of the VSB is measured in terms of adsorption efficiency. Adsorption efficiency is defined as the percentage of initial sorbent that is adsorbed during the VSB process. Extractive measurements of the sorbate concentration downstream of the VSB, in combination with the known initial sorbate concentration of the gas stream entering the VSB, yields the absorption efficiency. The experimental test matrix provides the necessary data to correlate VSB performance with gas temperature, moisture content, and velocity; sorbent charge and mass injection rate; electrostatic drift-to-freestream velocity ratios; and AC voltage and frequency.

A Buck Analytic adsorption spectrometer measures elemental mercury concentrations in extracted gas samples down to single ppb concentrations. Extracted gas samples are taken downstream of the VSB, eliminating the need to filter the extracted gas sample before it enters the Buck analyzer. Both powdered activated carbon and high carbon fly ash serve as sorbents; the fly ash may prove attractive if its generally poor adsorption characteristics are mitigated by improved mass transfer in the VSB and its low cost.

Doping the powdered activated carbon with fluorescent microspheres will allow direct imaging of select particle paths when the VSB suspension is illuminated with the appropriate frequency of UV light. Capturing such images using a digital camera will allow verification that the charged VSB suspension is responding directly to the frequency and amplitude of the applied AC field. Any damping or phase lag of the sinusoidal oscillations, or any spatial variations in the amplitude or frequency of the oscillations of the particle's paths will be revealed through analysis of these images.

Figure 9:
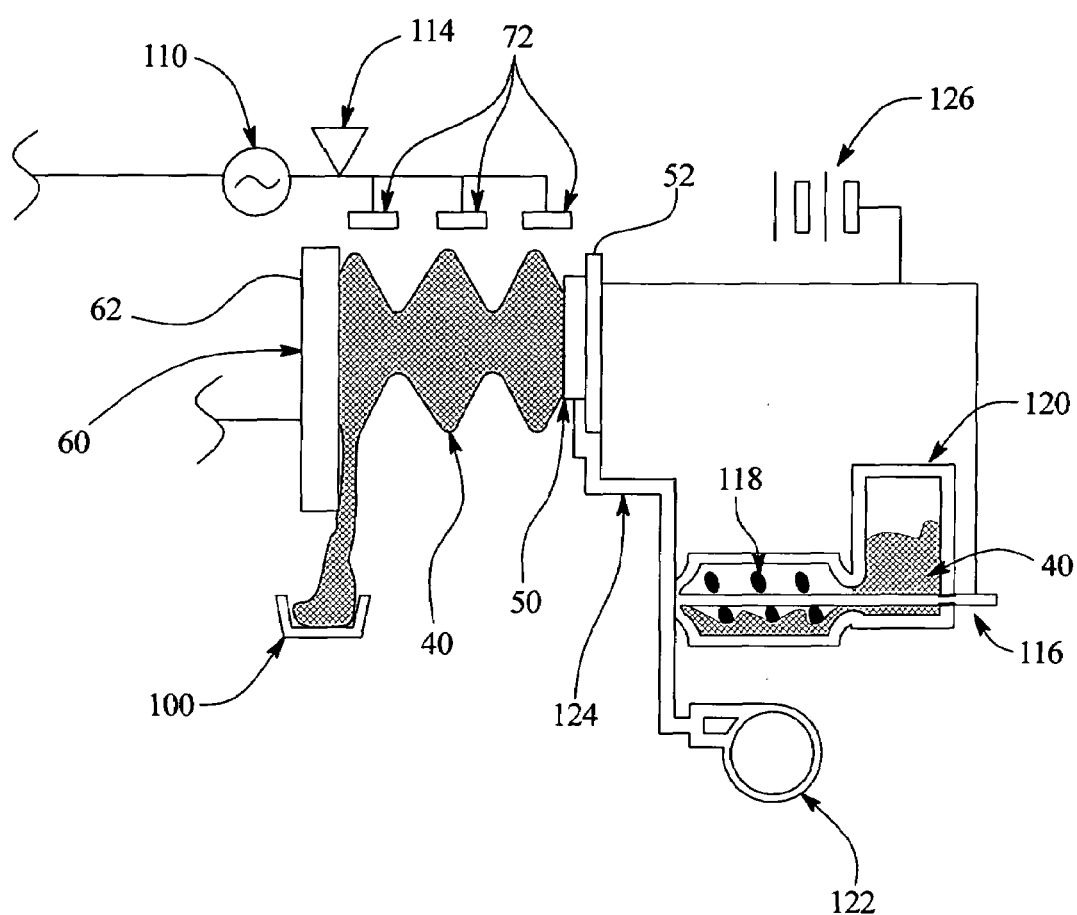
Figure 10:
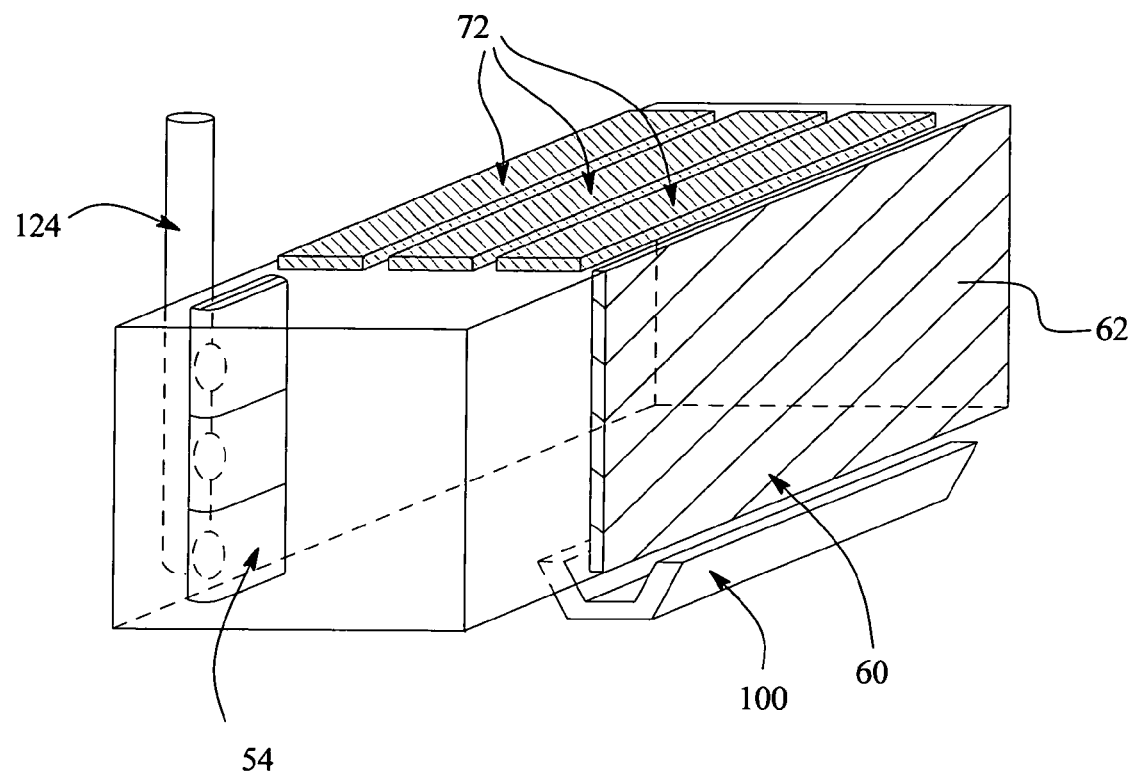
Figure 11:
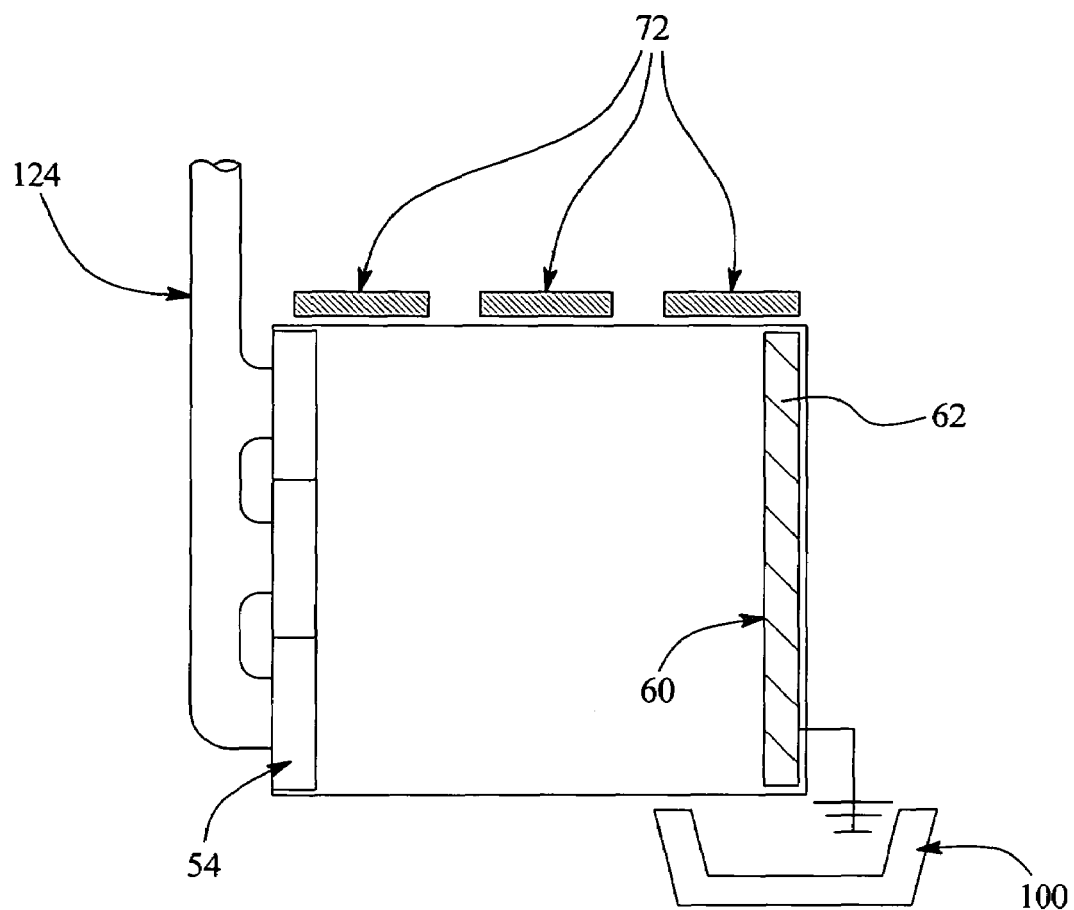
Figure 12:
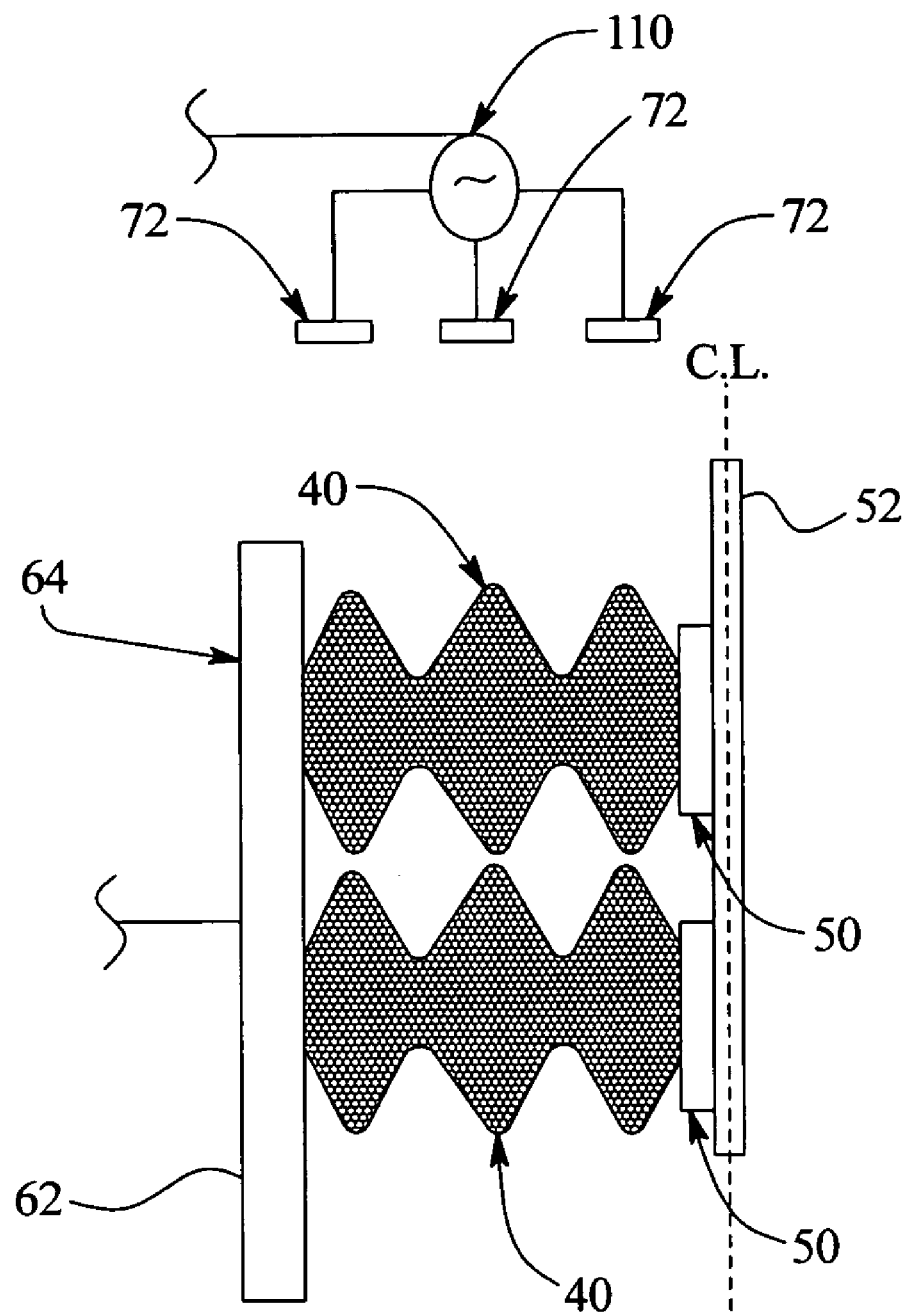
Figure 13:
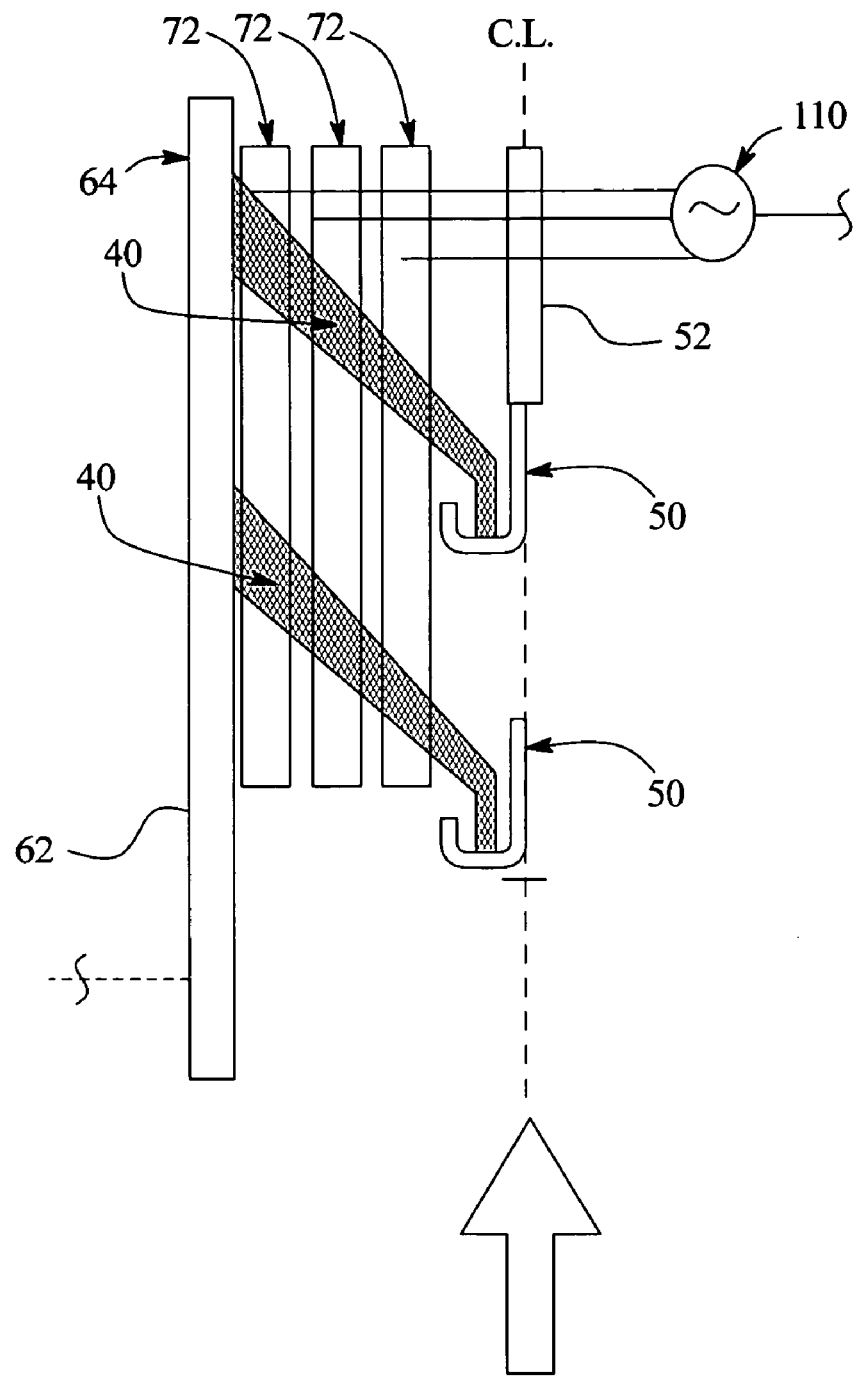

In another embodiment illustrated in FIG. 9, the VSB system 20 comprises one or more openings, passages, vents, injectors or outlets 50 for introducing the sorbent or material 40 into the gas stream, wherein the material 40 is capable of receiving a contaminant from the gas stream. Receiving a contaminant may refer to absorbing, adsorbing or contacting the contaminant or may refer to the surrounding conditions (e.g. air pressure, air currents, temperature, material or contaminant motion) within the gas stream that cause or induce mass transfer from the gas phase to the solid or liquid phase of the material 40. For example, the first and second electric fields may facilitate the mass transfer between a charged powdered solid material such as activated carbon and trace amounts of gas species within the gas stream. Preferably, the outlet 50 injects the charged material 40 into the gas stream in a sheet-like manner so that the charged material covers a large volume in the gas stream.

It should be appreciated that the material 40 may be any solid or liquid material capable of receiving a contaminant from a waste gas stream. For example, the material 40 can be a solid material such as a sorbent, catalyst or combinations thereof. The sorbent can be powdered material such as powdered activated carbon. Further, the contaminants in the gas stream may undergo reactions by contacting the catalysts. In addition, the material 40 may be capable of receiving a plurality of contaminants from the gas stream.

The VSB system 20 also comprises at least a first charged DC electrode 52, at least a second charged DC electrode 62 and at least one charged AC electrode 72. The first charged DC electrode 52, the second charged DC electrode 62 and the at least one charged AC electrode 72 may, for example, be oriented substantially peripheral to the gas stream and normal to the flow of the gas stream. The first DC charged electrode 52 and the second charged DC electrode 62 cooperatively generate a first electric field that imparts a drift velocity to the material 40. One or more charged AC electrodes 72 generate a second electric field that imparts additional motion to the material. The additional motion may be two or three dimensional motion and may be periodic such as sinusoidal motion or square wave motion. The additional motion induced by the second electric field may more efficiently and effectively improve the facilitation of mass transfer of the contaminants in the gas to the material 40. It should be appreciated that the first charged DC electrode 52, the second charged DC electrode 62 and the at least one charged AC electrode 72 may, be oriented in any suitable manner at, near or away from the gas stream to achieve the same objective of facilitating mass transfer of the contaminants in the gas to the material 40.

In an embodiment, the material 40 is electrically charged prior to entering the gas stream. Generally, the charged material 40 is more readily influenced and manipulated by the electric fields generated by the DC and AC electrodes. Accordingly, the charged material 40 in the VSB system 20 undergo greater motion within the gas stream. It should be appreciated that the material 40 can be charged by any suitable method known to those having ordinary skill in the art.

In an embodiment, the first charged DC electrode 52 and the second charged DC electrode 62 have a different voltage. For example, the first charged DC electrode 52 can be positively charged and the second charged DC electrode 62 can be negatively charged. Alternatively, the first charged DC electrode 52 and the second charged DC electrode 62 can have a voltage differential sufficient enough to cause a DC electric field between the first and second charged DC electrodes. In another embodiment, the first charged DC electrode 52 could have a positive or negative voltage and the second charged DC electrode 62 could be the ground (i.e. 0 voltage). It should be appreciated that any suitable combination of voltages/ground can be used for the first and second DC electrodes to generate a potential difference and a direct current field between the electrodes.

In an embodiment illustrated in FIG. 9, the second charged DC electrode 62 can comprise a charged plate 60 capable of receiving or collecting the material 40. For example, before the material 40 in the gas stream leaves the VSB system 20, some or all of it collects or amasses on the plate 60 because of the voltage differential between the first charged DC electrode 52 and the second charged DC electrode 62.

In an embodiment, the VSB system 20 may have a voltage source 110 connected to ground (not shown) and connected to an amplitude and frequency controller 114. The size, shape, and configuration of the controller 114 and the voltage source 110 is can by any suitable for use. The amplitude and frequency controller 114 is connected to one or more AC electrodes 72 as shown in FIG. 9. The AC electrodes 72 are preferably oriented longitudinally parallel to the flow of the gas stream, with the leading edge of the AC electrodes on the same plane as the following edge of the charged injectors or outlets 54, on a plane perpendicular to the flow of the gas stream. The AC electrodes 72 can be connected to the interior housing of a gas stream containment.

Each charged AC electrode 72 is individually be capable of generating a secondary electric field that imparts the additional motion to the material. For example, the AC electrodes 72 create an electric field of frequency and period as regulated by the amplitude and frequency controller 114 to facilitate the mass transfer between the material 40 and the trace gas species to be removed from the gas stream. The AC electrodes 72 can be made of any suitable conductive material such as, but not limited to, copper, aluminum, or steel. Preferably, the AC electrodes 72 may have a curved cross-section along the short length only, convex toward the gas flow; however other shapes can be used.

As illustrated in FIG. 9, in an embodiment, a motor (not shown) connected to a driveshaft 116 cooperates to drive an auger 118. The auger 118 may be made of any conductive material. One end of the auger 118 connects with a hopper 120 for supplying a material 40 such as charged powdered solid material into a conduit 124. The hopper 120 can be any suitable shape, size or configuration. The conduit 124 can also be of any suitable shape, size or cross-section, configuration and contortion sufficient to facilitate the mixing and transmission of the powdered solid material. The conduit 124 can be fed motive air by a fan 122 which connects to the conduit 124 upstream of the material 40 feed. Motive air may also be supplied to the conduit 124 using a source of compressed air (not shown).

A voltage source 126 can be connected to the auger 118 to facilitate charging of the material 40 prior to dispersal into the gas stream. Motive air mixes with the material 40 within the conduit 124.

In an embodiment illustrated in FIGS. 10-11, one or more outlets 50 can comprise the first charged DC electrode 52 to form a charged injector or outlet 54 thereby simplifying the VSB system 20. The charged ground plate 60 can be fixed to an interior housing of the gas flow and opposite the charged outlets. The leading edge of the ground plate 60 can be on the same plane as the following edge of the charged outlets 54, on a plane perpendicular to the flow of the gas stream. Preferably, the ground plate 60 is rectangular in shape; however, other suitable shapes can be used. The ground plate 60 can be connected to a ground and can be made of any conductive material.

A collection trough 100 for solid or liquid materials can be positioned below the ground plate 60 to facilitate the collection of the material 40. Preferably, the powder collection trough 100 is a channel, oriented to collect material 40 as it falls from the ground plate. The longitudinal axis of the trough 100 can be parallel to the direction of gas flow as shown in FIGS. 10-11.

After any given period of time after the material 40 has collected on the plate 60, the plate 60 can be tapped, hit or vibrated to cause the material 40 to fall into a powder or liquid collection trough 100. The powder or liquid collection trough 100 can accumulate the liquid material or the solid material for subsequent re-use or recycling. This can generate cost-savings through reuse of the sorbent material.

It should be appreciated that the outlet 52 can comprise any suitable mechanism for introducing material into the gas stream. Preferably the outlet 52 has a wide opening, for example, capable of forming a dense layer of charged powdered material 40 in the gas stream.

As illustrated in FIG. 10, in an embodiment, the conduit 124 can connect to a plurality of charged outlets 54. The plurality of charged outlets 54 are also connected to the voltage source 126. The charged outlets 54 may be fixed to the interior wall of the housing of the gas stream oriented vertically, normal to the flow of the gas stream, spanning the height of the gas stream. The cross-section of the leading edge of the charged outlets 54 is preferably curved to prevent the formation of turbulent eddies in the gas stream. The charged outlets 54 may be oriented to facilitate the dispersal of powdered solid material into the gas stream parallel to the flow of the gas stream, and at gas stream velocity. The charged outlets 54 may be made of any suitable conductive material.

In an embodiment, the outlet 50 can comprise a plurality of outlets that are stacked as illustrated in FIG. 12, or the outlet 50 can comprise a plurality of outlets that are in series along the gas stream as illustrated in FIG. 13. It should be appreciated that the embodiments shown in FIGS. 12-13 may represent half of the embodiments as depicted by the center line C.L. For example, the outlets 50 and first DC electrode 52 may have the plate 60, second DC electrodes 62 and AC electrodes on both sides to double the flow-through gas volume.

In an embodiment, the outlet of the VSB system 20 may be capable of injecting a liquid into the gas stream. For example, the outlet or outlets may be injectors or any suitable devices for injecting a liquid into the gas stream. The liquid can be dispersed, for example, as an aerosol. Preferably, the injector or injectors for injecting liquid are located upstream of the first charged DC electrode at a distance sufficient to assure a largely dispersion and uniform liquid distribution within the gas stream by the time the liquid in the gas stream reaches the charged electrodes. For example, the injected liquid can be an ammonia solution, a urea solution, an aerosol and combinations thereof.

In an alternative embodiment, the VSB system 20 comprises: a plurality of positively charged DC outlets for introducing a material into the gas stream, wherein the material is capable of receiving the contaminant from the gas stream and wherein the positively charged DC outlets are oriented substantially peripheral to the gas stream and normal to the flow of the gas stream; at least a second negatively charged DC electrode located downstream of the positively charged DC outlets and oriented substantially peripheral to the gas stream and normal to the flow of the gas stream, wherein the plurality of positively charged DC outlets and the second negatively charged DC electrode cooperatively generate a first electric field that imparts a drift velocity to the material; and a plurality of charged AC electrodes oriented substantially peripheral to the gas stream and normal to the flow of the gas stream, wherein the plurality of charged AC electrodes generate a second electric field that imparts additional motion to the material.

In another embodiment, a method for receiving contaminants in a gas stream using the VSB system 20 comprises: a) introducing a material into the gas stream through at least one outlet, wherein the material is capable of receiving the contaminant from the gas stream; b) generating a first electric field from at least a first DC charged electrode and at least a second charged DC electrode, wherein the first electric field imparts a drift velocity to the material and wherein the first and second DC charged electrodes are oriented substantially peripheral to the gas stream and normal to the flow of the gas stream; and c) generating a second electric field from at least one charged AC electrode oriented substantially peripheral to the gas stream and normal to the flow of the gas stream, wherein the second electric field imparts additional motion to the material. In a further embodiment, the method comprises accumulating and collecting the material after the material has removed the contaminant from the gas stream.

By way of example and not by limitation, the following additional embodiments of the VSB system 20 are contemplated.

In an embodiment, any suitable powdered catalysts such as titanium and vanadium could be introduced into the gas stream through the powdered solid material introducing mechanism 100. For example, the powdered catalysts can facilitate the use of the VSB system 20 to remove nitrogen oxides from waste gas streams. One or more liquid injectors could be used to disperse ammonia into the gas stream. Preferably, the liquid injectors should be placed upstream of the charged electrodes a distance sufficient to assure a largely uniform ammonia distribution within the gas stream at the charged electrodes.

In another embodiment, several VSBs could be placed in series with each VSB facilitating the removal of different trace gas species.

In an alternative embodiment, the VSB system 20 could facilitate the increase of mass transfer between trace gas species and powdered solid material if the solid material were introduced in bulk and charged with a corona as is typical in electrostatic precipitators.

In an embodiment, the VSB system 20 could facilitate the increase of mass transfer between trace gas species and powdered solid material if the solid material were formed or precipitated in situ upstream of the VSB system 20. For example, a particle could be formed in situ by condensing a vapor by precipitation or as a by-product of a combustion process. The solid material formed in situ could then pass over a charged corona as is typical in electrostatic precipitators.

In another embodiment, the VSB system 20 could be used as part of an integrated system for detecting chemical and biological warfare (CBW) agents. For example, impedance-based electrochemical sensors detect the presence of CBW agents by measuring the change in impedance of a thin film of water. Biomolecular recognition technology has previously suffered from several perceived shortcomings. The fact that biomolecules operate only in aqueous environments previously made biosensors unsuitable for detecting species in the gas phase. Low analyte concentrations slowed detection due to their effects on the kinetics of specific biomolecular recognition interactions. Such characteristics severely limited transfer of biosensor technology to practical applications.

The VSB system 20 overcomes these obstacles. Using an embodiment of the VSB system 20, the CBW agent is transferred to the liquid phase by a novel, enhanced mass transfer process. The ability to rapidly and efficiently transfer a gas-phase analyte to the liquid phase is a major advance over competing technology.

To detect airborne threats, aqueous phase detection devices must necessarily transfer the analyte from the gas phase of the sampled air stream to the aqueous film. Conventional gas chromatography relies on gaseous diffusion to affect this mass transfer process. However, because Fickian gas diffusion rates are proportional to the concentration gradient, diffusive mass transfer rates are extremely slow for trace analyte concentrations, such as would be expected for CBW agents. Bench-top gas chromatography addresses this issue by using long, narrow-bore tubes to provide long residence times and short diffusion distances. Such features are impractical if compact packaging, high throughput, low power consumption, and near-real-time detection are desired.

In an embodiment, the VSB system 20 is well-suited for such challenging gas-liquid mass transfer tasks. For example, the VSB system 20 is capable of removing part-per-billion concentrations of elemental mercury from coal combustion exhaust gases. In another embodiment, the VSB system 20 introduces a charged aerosol sorbent into the target gas stream. The suspended aerosol is then preferably subjected to two mutually orthogonal electric fields: a) a DC field that induces a constant, cross-stream drift velocity on each sorbent particle, and b) an AC field that superimposes an orthogonal, sinusoidal velocity component. Adapting the VSB system 20 for highly efficient gas separation for CBW agent detection holds significant promise. In an embodiment, the VSB system 20 is adapted for CBW agent detection might use a liquid aerosol of atomized water droplets. Further, in an alternative embodiment, the VSB system 20 uses electric fields to manipulate charged aerosols offering exceptional opportunities for miniaturization. Because electric field strength varies inversely with characteristic dimension, the miniaturization desired of Micro Gas Analyzers will reduce the voltage requirements and power consumption associated with the VSB system 20.

In an embodiment, the VSB system 20 may be adapted for use with an aqueous phase detection device. For example, a gas stream extracted from the monitored volume of air first undergoes humidification by injecting a simple water mist from a prior art flush-mounted piezoelectric atomizer. Such piezoelectric atomizers are commonly found in household air humidifiers and easily produce fine mists of droplets with diameters on the order of 10 µm. The production of so many droplets of such small size provides a tremendous total surface area for adsorption of the analyte. As the mist evaporates, the gas stream becomes nearly saturated with water vapor (relative humidity ~100%). After the humidification process, a second array of piezoelectric atomizers injects a fine mist of charged water droplets. These charged droplets do not evaporate in the nearly saturated (water vapor) gas stream. These charged water droplets adsorb species from the gas-phase as they trace a sinuous path across the gas stream, drawn by the two mutually orthogonal AC and DC electric fields. After traversing the gas stream, the charged droplets impact the grounded plate electrode, lose their charge, and are collected. The collected, uncharged liquid is then directed to the aqueous phase detection device for detection and discrimination of CBW agents.

In an embodiment, the VSB system 20 exposes the gas to the exceptionally large surface area of the suspended aerosol. The three-dimensional motion induced in the dispersed phase by the electric fields insures a continuous high relative velocity between the two phases even as the aerosol is entrained in the gas flow. The product of the interphase relative velocity (m/s) and the exceptionally large adsorption surface area of the aerosol ($m^2$) yield a very high swept volume rate ($m^3/s$) that has a first-order effect on adsorption rate. The VSB system 20 preferably provides compact, low power mass transfer. Because the gas chromatographic approach of small bore columns is not used, VSBs present negligible additional pressure drop within the gas flow. The two electric fields consume little power due to the small flow of current between the electrodes, and the required voltage can be attained using solid state transformers. The VSB system 20 as described is well-suited for passive and nearly maintenance-free operation, only requiring electric power and a small supply of water for humidification. The water flows, electrostatic voltages and frequencies are all variable, allowing the system to be programmed to respond in real time to detection events.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A system comprising:
   at least one outlet for introducing a material into a gas stream, wherein the material is capable of receiving a contaminant from the gas stream;
   at least a first charged DC electrode;
   at least a second charged DC electrode, wherein the first DC charged electrode and the second charged DC electrode cooperatively generate a first electric field that imparts a drift velocity to the material; and
   a plurality of charged AC electrodes, each charged AC electrode oriented substantially peripheral to the gas stream and normal to the flow of the gas stream, wherein each charged AC electrode generates a second electric field that imparts additional motion to the material, and wherein the second electric field is orthogonal to the first electric field.

2. The system of claim 1, wherein the material is electrically charged prior to entering the gas stream.

3. The system of claim 1, wherein the first charged DC electrode and the second charged DC electrode have a different voltage.

4. The system of claim 1, wherein the second charged DC electrode has voltage of 0 and is grounded.

5. The system of claim 1, wherein the outlet comprises the first charged DC electrode.

6. The system of claim 1, wherein the second charged electrode comprises a plate so constructed and arranged for collecting the material.

7. The system of claim 1, wherein the at least one outlet comprises a plurality of outlets that are stacked.

8. The system of claim 1, wherein the at least one outlet comprises a plurality of outlets that are in series along the gas stream.

9. The system of claim 1, wherein the motion is periodic.

10. The system of claim 1, wherein the material is a solid material selected from the group consisting of a sorbent, a catalyst and combinations thereof.

11. The system of claim 1, wherein the material is capable of receiving a plurality of contaminants from the gas stream.

12. The system of claim 1, wherein the outlet is constructed and arranged for injecting a liquid into the gas stream.

13. The system of claim 12, wherein the outlet is located upstream of the first charged DC electrode.

14. The system of claim 12, wherein the injected liquid is selected from the group consisting of an ammonia solution, a urea solution, an aerosol and combinations thereof.

15. A virtual sorbent bed system for receiving a contaminant from a gas stream, the system comprising:
   a plurality of positively charged DC outlets for introducing a material into the gas stream, wherein the material is capable of receiving the contaminant from the gas stream and wherein the positively charged DC outlets are oriented substantially peripheral to the gas stream and normal to the flow of the gas stream;
   at least a second negatively charged DC electrode located downstream of the positively charged DC outlets and oriented substantially peripheral to the gas stream and normal to the flow of the gas stream, wherein the plurality of positively charged DC outlets and the second negatively charged DC electrode cooperatively generate a first electric field that imparts a drift velocity to the material; and
   a plurality of charged AC electrodes oriented substantially peripheral to the gas stream and normal to the flow of the gas stream, wherein the plurality of charged AC electrodes generate a second electric field that imparts additional three-dimensional motion to the material.

16. The system of claim 15, wherein the material is selected from the group consisting of a solid material, a liquid material, a powdered material, an aerosol, a sorbent, a catalyst and combinations thereof.

17. The system of claim 16, wherein the material is capable of receiving a plurality of contaminants from the gas stream.

18. The system of claim 15, wherein the material is electrically charged prior to entering the gas stream.

* * * * *